United States Patent [19]

Emori

[11] Patent Number: 5,043,798

[45] Date of Patent: Aug. 27, 1991

[54] BAND COMPRESSION TRANSMISSION SYSTEM FOR VIDEO SIGNAL USING SUB-NYQUIST SAMPLING

[75] Inventor: Takahisa Emori, Tokyo, Japan

[73] Assignee: Attain Development Co., Ltd., Japan

[21] Appl. No.: 406,164

[22] Filed: Sep. 12, 1989

[30] Foreign Application Priority Data

Sep. 16, 1988 [JP] Japan .................................. 63-229900

[51] Int. Cl.$^5$ .............................................. H04N 11/06
[52] U.S. Cl. ........................................ 358/12; 358/138
[58] Field of Search .................... 358/138, 12, 13, 15, 358/133, 36, 186

[56] References Cited

U.S. PATENT DOCUMENTS

| | | | |
|---|---|---|---|
| 2,716,151 | 8/1955 | Smith | 358/12 X |
| 2,810,780 | 10/1957 | Loughlin | 358/12 |
| 3,566,023 | 2/1971 | Smierciak | 358/138 |
| 4,521,803 | 6/1985 | Gittinger | 358/12 |
| 4,672,427 | 6/1987 | Rzeszewski | 358/138 X |
| 4,692,801 | 9/1987 | Ninomiya et al. | 358/138 X |
| 4,707,737 | 11/1987 | Adachi et al. | 358/138 X |
| 4,743,965 | 5/1988 | Yamada et al. | 358/138 X |
| 4,772,961 | 9/1988 | Ichinoi | 358/138 X |

Primary Examiner—Victor R. Kostak
Attorney, Agent, or Firm—Andrus, Sceales, Starke & Sawall

[57] ABSTRACT

A band compression transmission system for video signal comprises a sampling circuit wherein a video signal having a maximum frequency $f_m$ and satisfying the formula $f_c = (N/M) \times f_H$ (where M and N are positive integers satisfying the relationship N>M, where N/M is an irreducible fraction, and $f_H$ is the horizontal scanning frequency of the image signal) and with a frequency of less than or equal to twice the maximum transmission frequency of the transmission path, are given a first sub-Nyquist sampling by sampling signals with a frequency $f_c$ which is larger than the maximum frequency $f_m$ and where the phases of odd-numbered fields and even-numbered fields differ by 180°, and digital-to-analog converters to which sampled signals are converted into analog image signals.

6 Claims, 5 Drawing Sheets

FIRST & SECOND FIELDS

THIRD & FOURTH FIELDS

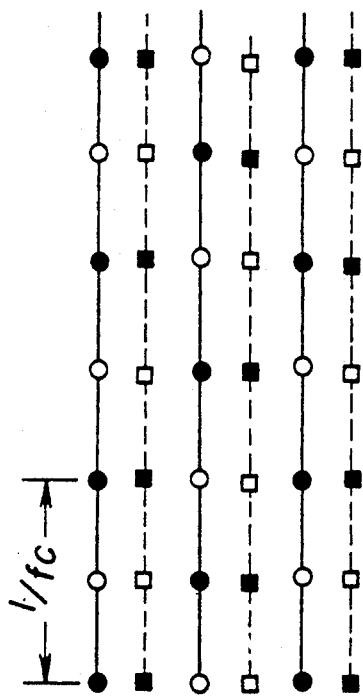
FIG.2
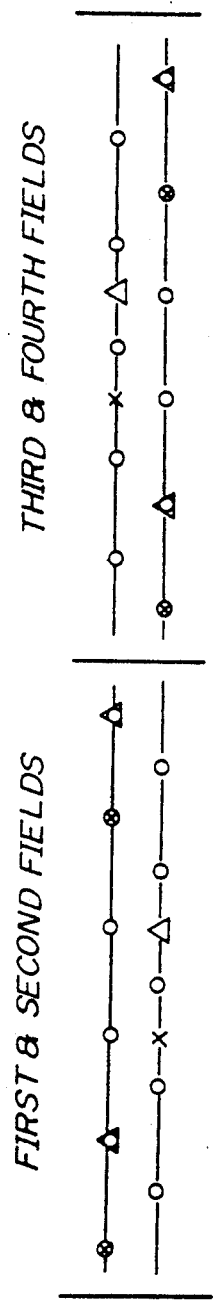
FIG. 3(A) FIRST & SECOND FIELDS
FIG. 3(B) THIRD & FOURTH FIELDS

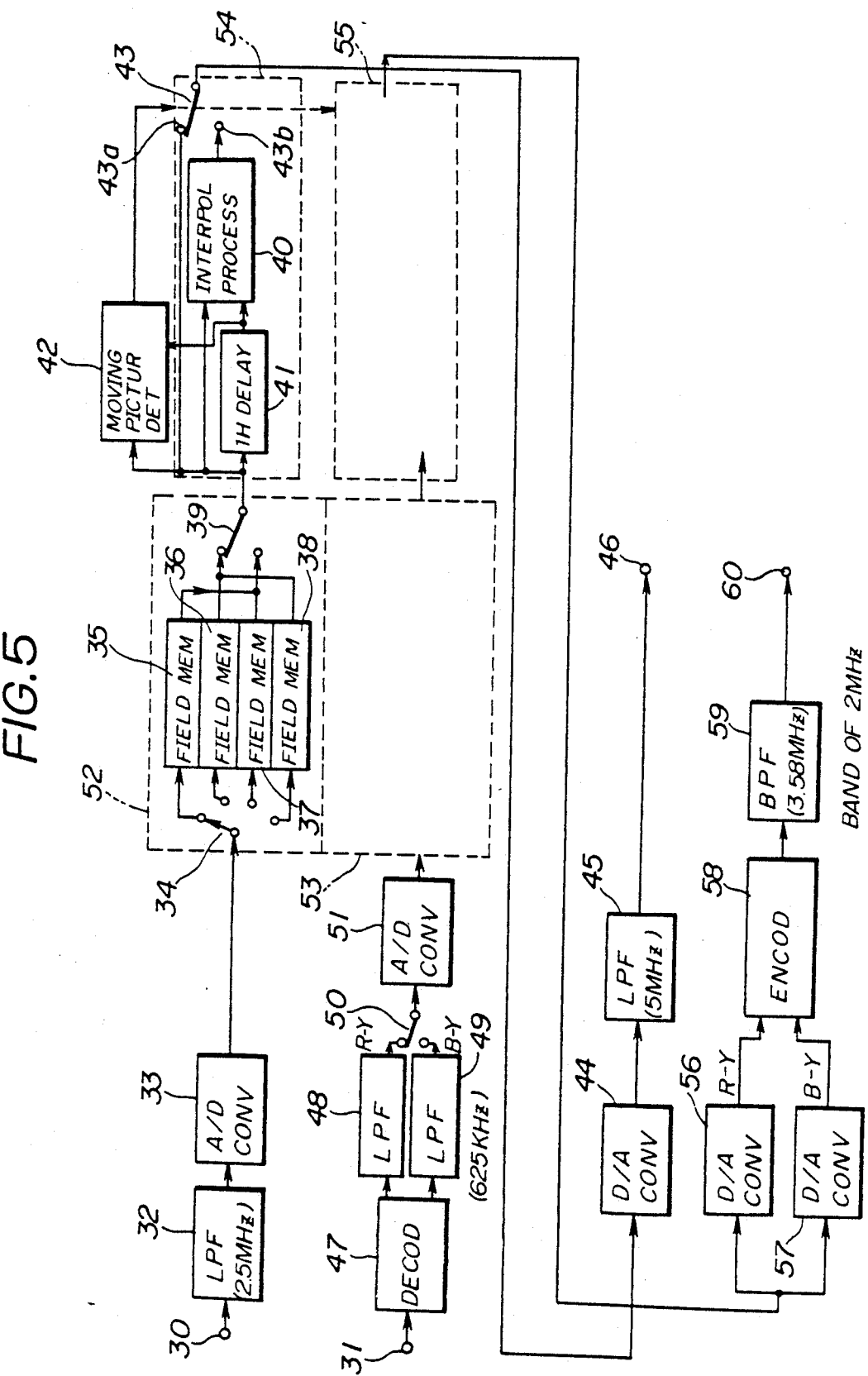

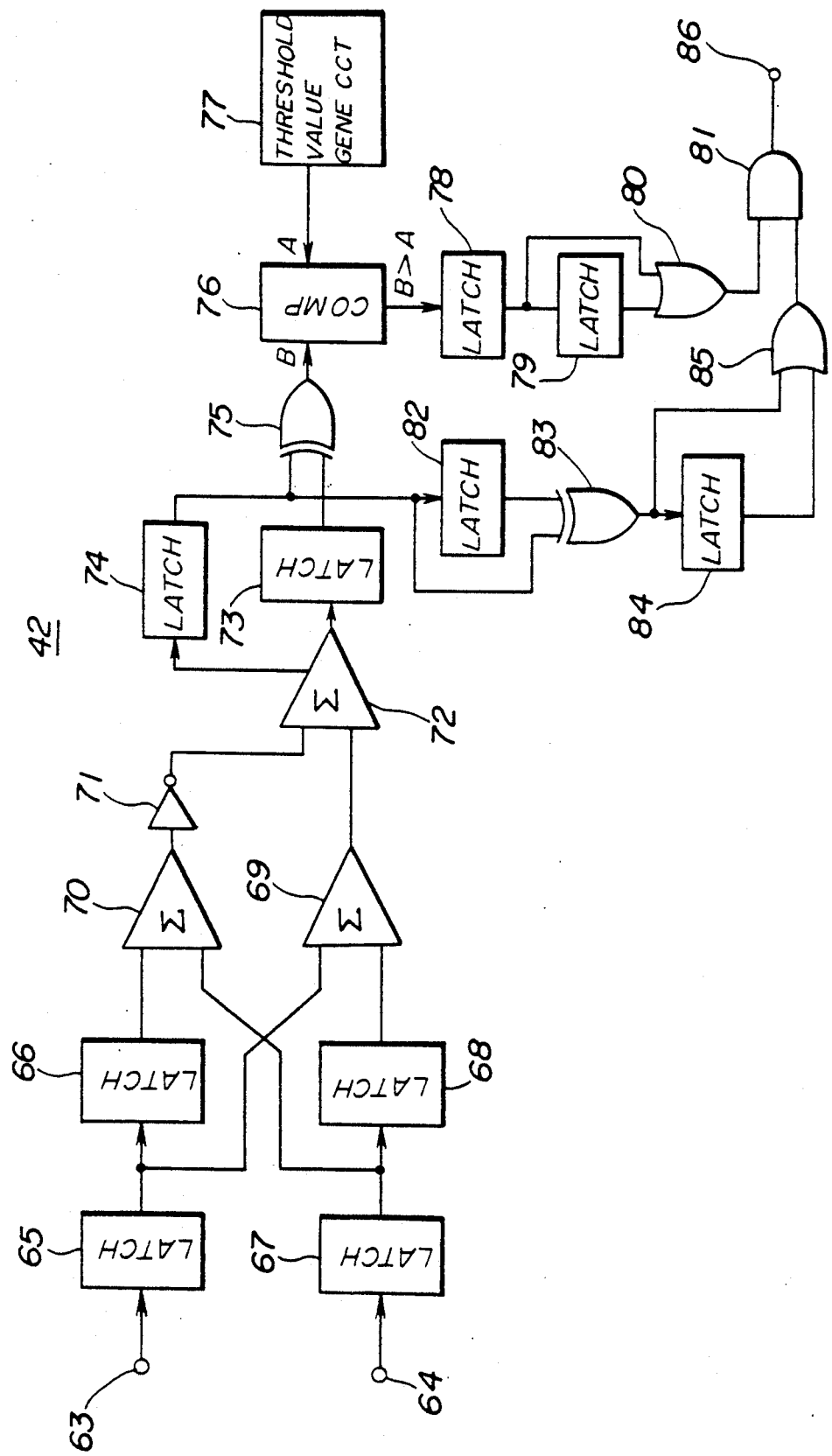

BAND COMPRESSION TRANSMISSION SYSTEM FOR VIDEO SIGNAL USING SUB-NYQUIST SAMPLING

BACKGROUND OF THE INVENTION

The present invention generally relates to band compression transmission systems for video signals using sub-Nyquist sampling, and more particularly to a band compression transmission system for video signal using sub-Nyquist sampling in which a video signal is subjected to a sub-Nyquist sampling at a predetermined frequency before being converted into an analog video signal and transmitted, and a receiving side obtains a reproduced video signal by again subjecting the analog video signal to a sub-Nyquist sampling before passing it through a digital-to-analog (D/A) converter.

The sub-Nyquist sampling is conventionally known as a method of sampling a video signal at a sampling frequency which is selected lower than a minimum Nyquist frequency which is a frequency twice a highest frequency $f_m$ necessary for the video signal, and which sampling frequency is also selected to a ½ line offset frequency.

The sub-Nyquist sampling utilizes a characteristic which is peculiar to the video signal and is known as frame correlation. The transmission bandwidth can be made very narrow, and it is possible to transmit a broadband video signal in a transmission path which has a narrow bandwidth and to improve the resolution.

However, although the video signal transmission system using the sub-Nyquist sampling has no deterioration due to sampling of still images, the images of each frame differ in the case of dynamic images and the reproduced image becomes a double image with a strong impression of an afterimage.

In sampling interpolation systems that utilize line correlation, the line correlation can remove the afterimages to a certain extent even in the case of dynamic images but perfect image reproduction is still not possible for images for which there is no line correlation (such as lines inclined at 45°).

Moreover, a luminance/color (Y/C) separation circuit using line correlation cannot perform complete Y/C separation for images that have no line correlation and this results in a carrier chrominance signal being mixed into the luminance signal. This is to say that a beat component is generated for the difference between the chrominance sub-carrier frequency and the sampling frequency used for sampling the luminance signal by the sub-Nyquist sampling. The result of this is the problem known as beat interference that consists of vertical stripes of a relatively wide width appearing on the screen.

SUMMARY OF THE INVENTION

It is a general object of the present invention to provide a novel and useful band compression transmission system for video signal using sub-Nyquist sampling in which the problems described above are eliminated.

More specifically, the object of this invention is to provide a band compression transmission system for video signal using sub-Nyquist sampling, on the transmitting side of which, a video signal with a maximum frequency of $f_m$ is sampled by a first sampling pulse which has a predetermined frequency $f_c$ greater than or equal to twice a maximum transmission frequency of an existing transmission path and is higher than $f_m$ and the phase of which first sampling pulse differs by 180° between the odd and even fields, and a sampled signal obtained thereby is converted into an analog video signal and sent to the transmission path and on the receiving side of which, the analog video signal is re-sampled by a second sampling pulse which has the sampling frequency $f_c$ and has a phase difference of 180° between the odd and fields, and a composite signal generated based on a re-sampled signal is passed through a D/A converter with a clock frequency of $2f_c$ to obtain a reproduced video signal.

According to the system of this invention, it is possible to compress the band and transmit the video signal that has a transmission band broader than the transmission band of the existing transmission path and at the same time, it is possible to use existing receiving systems for interchangeable reproduction without there being any deterioration of the image quality. Moreover, the beat interference in the video signal for which there is insufficient Y/C separation is controlled by the sub-Nyquist sampling so that it is less apparent to the point of being practically inconspicuous.

Furthermore, another object of this invention is to provide a band compression transmission system for video signal using sub-Nyquist sampling, on the receiving side of which, the re-sampled signal is passed through a frame memory and a first composite signal is generated for the two fields of a present field and the field two fields before it, second composite signal is generated by performing interpolation processing using the line correlation based on a delayed signal output from a delay circuit which delays the first composite signal by a predetermined number of horizontal scanning periods, whether or not an image signal is for a dynamic image or not is detected by a detector output signal from a dynamic image detector circuit on the basis of a difference between each pixel and its surrounding pixels of the first composite signal, and in which the first composite signal taken out from a switch circuit that selectively outputs said first composite signal for dynamic image and the second composite signal for still images, is passed through a digital-to-analog (D/A) converter having a clock frequency of $2f_c$ to obtain the reproduced video signals.

According to the system of this invention, it is possible to obtain reproduced video signals in which there is either no or practically no afterimage irrespective of whether the image is a dynamic image or a still image. Not only this, high-quality reproduced video signals with a horizontal resolution higher than that which has been conventionally possible can also be obtained.

Other features and objects of the present invention will become apparent in the following explanation of the invention, with reference to the accompanying diagrams.

BRIEF DESCRIPTION OF THE DRAWINGS

FIG. 2 is a diagram illustrating the sampling points for luminance signal on the screen and according to this invention;

FIGS. 3a-3b are diagrams illustrating the sampling points for luminance and color difference signals on the screen and according to this invention;

FIG. 5 is a block system diagram of one embodiment of the receiving system according to this invention;

FIG. 7 is a circuit system diagram of one embodiment of the dynamic image detector circuit.

DESCRIPTION OF THE PREFERRED EMBODIMENTS

If the first composite signal is for a still image, then there is frame correlation even for frames that have no line correlation and so there is no deterioration of the image. If it is for a dynamic image, the line correlation can be used to a certain extent to perform interpolation processing so that an image with little afterimage can be obtained. Accordingly, the composite signal taken from the switch circuit is always the one for which the amount of deterioration is smaller depending on whether the image is dynamic or still.

The composite signal output from this switch circuit is made up of each pixel of a signal re-sampled at a sampling frequency of $f_c$ for one field, and each pixel of a signal re-sampled at a sampling frequency of $f_c$ for another one field at a different position. The signal therefore has an actual sampling frequency of $2f_c$.

The composite signal output from this switch circuit is passed through a D/A converter having a clock frequency of $2f_c$ to produce a reproduced analog video signal having a maximum frequency $f_m$ which is higher than the transmission frequency of a transmission path.

However, the phases of the first and second sampling pulses reverse for each field and so the sampling phase for odd-numbered fields and the sampling phase for even-numbered fields differ by 180°. Therefore, the beat interference that occurs with respect to the video signal that has insufficient Y/C separation because of the image having no line correlation, appears on the screen at different positions in two adjacent frames and so is not as visually apparent on the screen reproducing the reproduced analog video signal.

Figure 1:
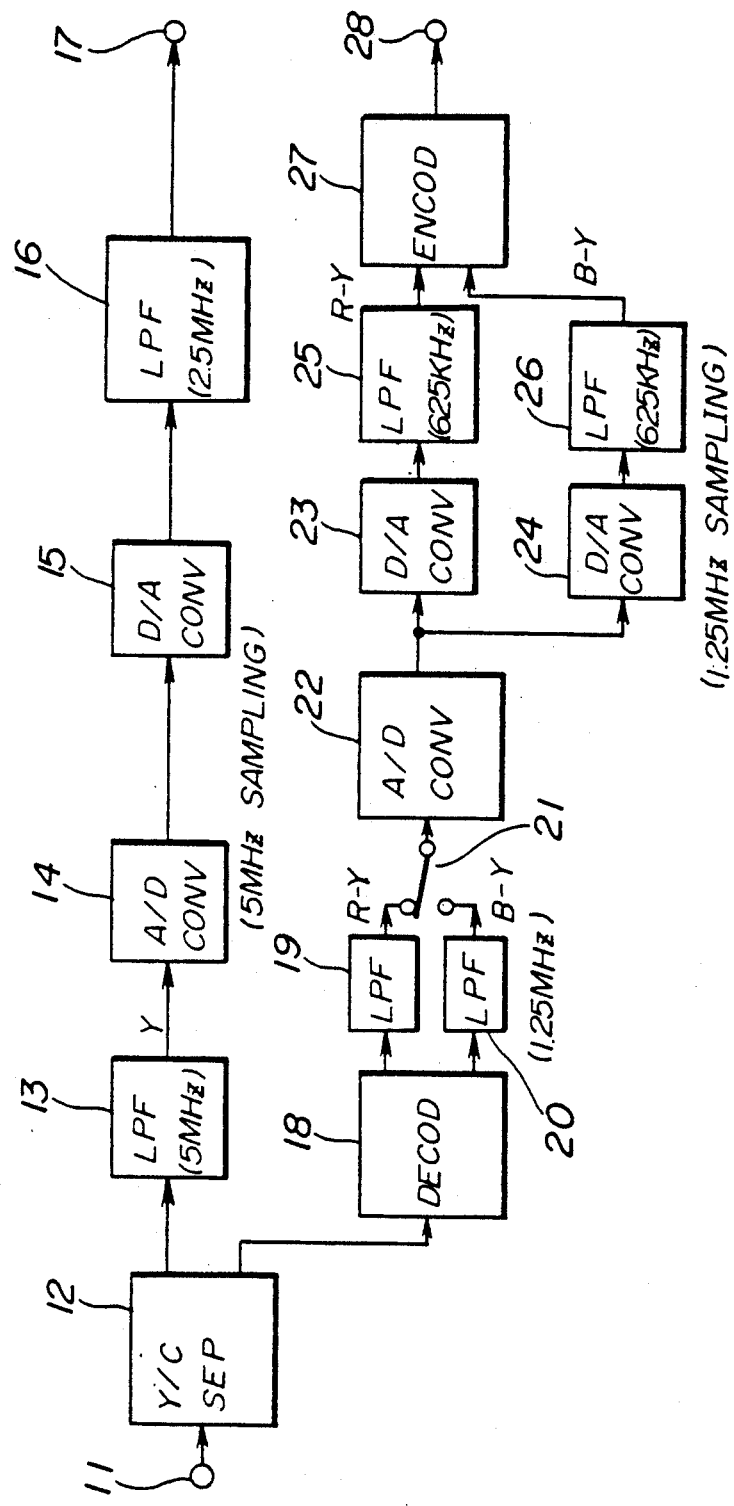
FIG. 1 is a block diagram of one embodiment of the transmission system according to this invention.

The following is an explanation of a first embodiment of this invention. FIG. 1 is an embodiment in which this invention is applied to a VTR, and in which a broadband NTSC color video signal arriving at input terminal 11 is supplied to a Y/C separation circuit 12. The Y/C separation 12 is a known circuit using a comb filter comprising a 1H delay circuit (where H is the horizontal scanning period) and a circuit to add/subtract the input and output of the delay circuit, and can separate only the carrier chrominance signal and only the luminance signal from NTSC color video signal, and without there being any loss of the luminance signal component in the high-frequency region in which the carrier chrominance signal is band-share-multiplexed.

The separated luminance signal has a broadband with a maximum frequency of 4.2 MHz for example, and is supplied to a lowpass filter (LPF) 13 where the frequency component of the later described sampling frequency $f_{c1}$ or more is removed and the signal supplied to the A/D converter 14 which is the first sampling means.

The A/D converter 14 generates sampled signals by sampling the input luminance signal at a sampling frequency $f_{c1}$ that satisfies the following formula, and where the first sampling pulses for the luminance signal have a 180° phase difference between odd-numbered fields and even-numbered fields.

$$f_c = (N/M) \times f_H \quad (1)$$

In this formula, N and M are positive integers, N/M is an irreducible fraction, and $f_H$ is the horizontal scanning frequency of the video signal. Also, the sampling frequency $f_c$ and the maximum frequency $f_m$ of the video signal have the following relationship.

$$f_c > f_m \quad (2)$$

Furthermore, the sampling frequency $f_c$ is a frequency equal to or lower than a frequency that is twice the maximum transmission frequency of the transmission path. This is because the sampled signals are to be transmitted over an existing transmission path.

Accordingly, the above mentioned sampling frequency $f_{c1}$ was selected as 5.011363 MHz so that N=637 and M=2 in formula (1). (This will be referred to as 5 MHz, for the sake of convenience.)

This sampling frequency of 5 MHz satisfies both the condition in formula (2) of being a frequency higher than the maximum frequency of 4.2 MHz(=$f_m$) for video signal in the current NTSC system, and the condition of being a frequency lower than a frequency twice that of 3 MHz which is the maximum frequency of the recording and reproduction bandwidth for currently available VTR equipment, as will be described later.

Also, FIG. 2 is a graphical representation of the screen positions of the sampling points for the luminance signal sampled by the sampling frequency of 5 MHz with a phase difference of 180° between odd-numbered fields and even-numbered fields. In FIG. 2, the black circles represent the sampling points for the first field, the black squares represent the sampling points for the second field, the white circles represent the sampling points for the third field and the white squares represent the sampling points for the second field. The sampling points for each of the four fields are different and sampling for four fields (two frames) is repeated in sequence.

Continuing the explanation with reference to FIG. 1, the sampled signals taken from the A/D converter 14 are supplied to a first D/A converter 15 where they undergo digital-analog conversion based on a clock frequency of 5 MHz to return them to analog a video signal, luminance signal with a frequency equal to or less than one half of the sampling frequency $f_{c1}$ are filtered out by the lowpass filter (LPF) with a cutoff frequency of $f_c/2$ (i.e. 2.5 MHz), and the remaining signals supplied to the recording system of an existing VTR.

The carrier chrominance signal separated by the above mentioned Y/C separation circuit 12 is decoded by a decoder 18 into the two types of color difference signals R-Y and B-Y which are respectively passed through lowpass filters (LPF) 19 and 20 to remove the components with frequencies equal to or higher than the later described sampling frequency $f_{c2}$ so that aliasing distortion does not occur, are then combined time-sequentially and then supplied to an A/D converter which is a second sampling means.

The A/D converter 22 generates sampled signals by sampling the input sequential color difference signals at a sampling frequency $f_{c2}$ determined by previous formula (1) and with first sampling pulses for color difference signals where the phases for the odd-numbered fields and the even-numbered fields differ by 180°. Moreover, it is not necessary to reverse the phase for each field. The above described sampling frequency $f_{c2}$ is selected as 1.2528407 MHz which is one quarter of the previously mentioned sampling frequency $f_c$. (For the sake of convenience, this will be referred to as 1.25 MHz.)

This sampling frequency $f_{c2}$ is higher than the maximum frequency of the color difference signals, and is lower than approximately 6 MHz which is twice the value of the maximum frequency of the recording and reproduction bandwidth for currently available VTR equipment.

In FIG. 3, (A) and (B) represent the screen positions of the sampling points for the two types of sequential color difference signals taken from the A/D converter 22, and the sampling points for the luminance signal. In (A) and (B) of FIG. 3, the circles represent the sampling points for the luminance signal, the crosses represent the sampling points for the color difference signal R-Y and the triangles represent the sampling points for the color difference signal B-Y. Also, (A) represents the sampling points for the first field and second field, and (B) in the same figure represents the sampling points for the third and fourth field, with the sampling points being located at different positions for adjacent frames.

The sampled signals for the two types of sequential color difference signals taken from the A/D converter 22 in FIG. 1, are supplied to second and third D/A converters 23 and 24 where they are converted using different phases and a clock pulse with a repetition frequency of $f_{c2}$. By this, the analog color difference signal R-Y is taken out from the second D/A converter 23 and the analog color difference signal R-Y is taken out from the third D/A converter 24.

These color difference signals are filtered through respective lowpass filters (LPF) 25 and 26 to filter out the signal component with a frequency equal to or less than $f_{c2}/2$ (here, this is 625 KHz) and are then supplied to an encoder 27 where they are converted into a carrier chrominance signal with a chrominance subcarrier frequency of 2.58 MHz to be in conformity with the NTSC system, and are then supplied to an existing VTR system via an output terminal 28.

If the existing VTR has only an input terminal for the composite video signal, then the luminance signal and the carrier chrominance signal output from the above output terminals 17 and 18 can be added and the composite signal input to the composite video signal input terminal but the respective signals can be input as they are if there are separate recording input terminals for the luminance signal only and for the carrier chrominance signal only.

Figures 4A, 4B, 4C, 4D:
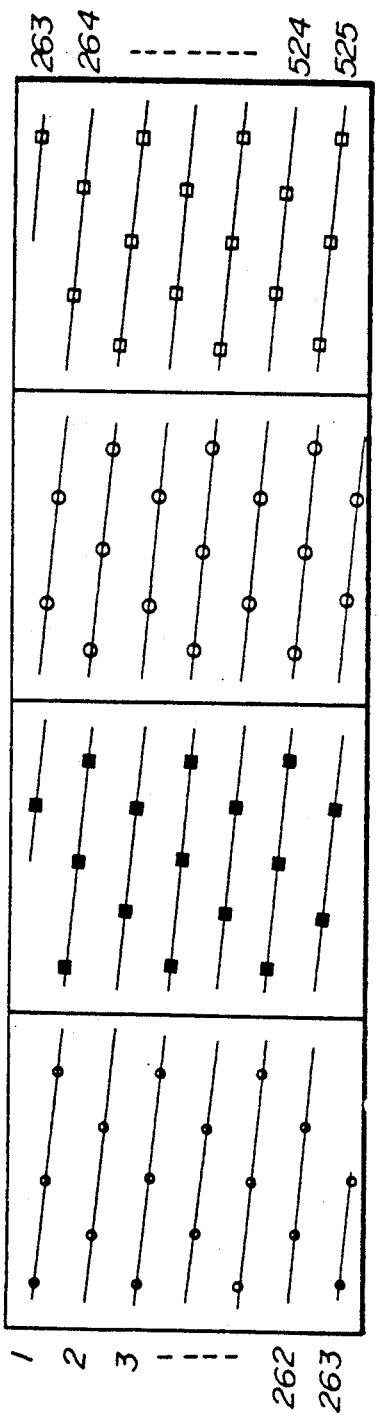
FIGS. 4a–4d are diagrams illustrating the sampling points for each field for the video signal recorded by the block diagram of FIG. 1.

As far as the luminance signal is concerned, the color video signal recorded on a magnetic tape by existing VTR is a video signal that have has its sampling points on the screen indicated by (A) in FIG. 4 for the first field, by (B) in the same figure for the second field, and by (C) and (D) for the third and fourth fields respectively, in the same way as the description for FIG. 2. The bandwidth is 2.5 MHz and so there is no problem in recording to existing VTR.

When the color video signal has already been recorded on the magnetic tape, reproducing this magnetic tape with an existing VTR involves indicating reproduction of the images at the sampling points in cycles of the four fields in the order of the first field, second field, third field and fourth field. The screen positions of these sampling points are shown in FIG. 4 by (A), (B), (C) and (D) respectively. Accordingly, according to this embodiment of the invention, recording and reproduction using an existing VTR are possible and the reproduced color video signal can be displayed on an existing television receiver with the image quality posing no problems for practical purposes (in that compatible reproduction is ensured).

The following will describe one embodiment of the receiving system (the reproduction system) of this invention. As has been described above, a known means is used to convert the color video signal reproduced on an existing VTR into reproduced luminance signal and reproduced carrier chrominance signal, and the reproduced luminance signal is input to an input terminal 30 and the reproduced carrier chrominance signal is input to an input terminal 31.

The reproduced luminance signal has the unnecessary high-frequency component removed by a lowpass filter 32 with a cutoff frequency of $f_{c1}/2$ (here, this is 2.5 MHz) and the signal is then supplied to an A/D conversion filter 33 which is the re-sampling means. The A/D conversion filter 33 samples the signal with second sampling pulses for the luminance signal with a repetition frequency of 5 MHz and where the phases of odd-numbered fields and even-numbered fields differ by 180°.

These sampled signals are digital signals comprising pixel data, and are passed through a switching circuit 34 that switches for each field, and supplied in order to field memories 35, 36, 37 and 38. The re-sampled signals for the four-field cycle input in order to field memories 35 through 38 have the pixel data for each field stored in one of the field memories 35 through 38, and then read out. The composite signal comprising the re-sampled signals of the first and third fields that are read out together from field memories 35 and 37, and the composite signal comprising the re-sampled signals of the second and fourth fields that are read out together from field memories 36 and 38, are selectively and alternately output for each field by a switch circuit 39.

As has already been explained, the composite signal output by the switch circuit 39 is composed of pixel data for one frame, and for practical purposes, is a re-sampled signal with a sampling frequency of $2f_{c1}$ (here, this is 10 MHz), and is supplied to an interpolation processing circuit 40, a 1H delay circuit 41, a dynamic image detector circuit 42 and to a terminal 43a of a switch circuit 43.

The circuit part formed by the interpolation processing circuit 40 and the 1H delay circuit 41 is a sampling interpolation type of circuit part utilizing line correlation. After passing the interpolation processing circuit 40, the above described re-sampled signals are subjected to 1H delay by the 1H delay circuit 41 and the high-frequency component of the delayed re-sampled signals obtained and the low-frequency component of the input re-sampled signals are combined alternately and in sequence for each $1/(2f_{c1})$ to produce a second composite re-sampled signal which is taken out and input to a terminal 43b of the switch circuit 43.

This switch circuit 43 has its switching controlled by the detection signal output by the dynamic image detector circuit 42, with an input composite sampled signal being selectively output to the terminal 43b when there is detection of a dynamic image, and an input re-sampled signal being selectively output to the terminal 43a when there is detection of still image.

Figure 6:
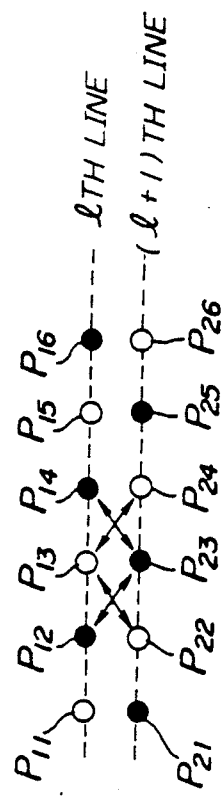
FIG. 6 is a diagram illustrating the principle used for the detection of dynamic image in the receiving system according to this invention.

The principle whereby this dynamic image detection circuit 42 can detect a dynamic image operates on the difference in levels of the re-sampled signals for the luminance signal of adjacent lines. This is to say that in FIG. 6 which indicates one part of the pixels (sampling points) of the two lines of l and l+1, the signal level for pixels $P_{11}$ through $P_{16}$ is $Y_{11}$ through $Y_{16}$, the signal level for pixels $P_{21}$ through $P_{26}$ is $Y_{2l}$ through $Y_{26}$, and so pixel $P_{13}$ can be calculated as follows.

$$a_{13} = (Y_{l2} + Y_{23}) - (Y_{13} + Y_{22})$$

In the same way, pixel $P_{l4}$ can be calculated as follows.

$$a_{14} = (Y_{l3} + Y_{24}) - (Y_{14} + Y_{23})$$

Therefore, the reference for detection of a dynamic image is as follows.

$|a_{13}| > A, |a_{14}| > A,$ and $a_{13} \cdot a_{14} < 0$ (where A is a positive constant)

It then becomes possible to detect dynamic images since the frequency of still image patterns simultaneously satisfying these three conditions is extremely low.

There are methods other than this for the detection of dynamic images but basically, it is possible to detect a dynamic image from the dynamic detection of a pixel and its surrounding eight pixels.

FIG. 7 indicates one embodiment of a dynamic image detection circuit 42 based on this principle. In the figure, 63 is a switch circuit, 39 is an input terminal for the output re-sampled signals and 64 is an input terminal for the re-sampled signals that have been delayed by 1H.

Latches 65 through 68 are 8-bit latches driven by a 10 MHz clock and that hold the input data. Adders 69 and 70 add the outputs of latches 65 through 68 and inverter 71 produces the complement of this which is in effect subtracted at the adder 72. The adder 72 outputs 8-bit data that is the two's complement, to latch 73 and also supplies a 1-bit carry-over signal to latch 74. The carry-over signal only becomes "1" when there is a carry over, that is, when the input data to the latch 73 is negative.

When there is output from the latch 74, an exclusive logical sum circuit 75 takes the 8-bit data taken in parallel from latch 73 and converts it to an absolute value. The output signal B of this exclusive logical sum circuit 75 is equivalent to the $|a_{13}|$ and $|a_{14}|$, etc. that were mentioned above, and is supplied to a comparator 76 and its magnitude compared with a threshold value generated by a threshold value generator circuit 77.

When B A for example, the comparator 76 outputs a high-level signal and supplies it to an OR circuit 80 via latches 78 and 79. The OR circuit 80 supplies to an AND circuit 81 only those high-level signals for which the values $|a_{13}|$ and $|a_{14}|$ from two continuous pixels are both greater then A. Here, this value of A is a threshold value for determining whether an image is dynamic or still, and is set to a predetermined value derived from experience.

The output of latch 74 and the exclusive logical sum circuit 83 cause alternately positive and negative high-level signals to be output from the exclusive logical sum circuit 83. By this, a high level is latched to latch 74 when $|a_{13}| \times |a_{14}| < 0$, and supplied to the AND circuit 81 via the OR circuit 85. Accordingly, a high-level signals is taken out as a dynamic image detection signal to output terminal 86 only when the three previously described conditions are satisfied.

Continuing the description of the operation with reference to FIG. 5, the composite signal taken from switch circuit 43 undergoes digital-analog conversion by D/A converter 44 operating at a clock frequency of $2f_{c1}$ (here, this is 10 MHz), and then has the signal component equal to or less than frequency $f_{c1}$ (i.e. 5 MHz) removed by lowpass filter (LPF) 45 so that luminance signal with a maximum frequency of 4.2 MHz is filtered, and is supplied to output terminal 36.

The reproduced carrier chrominance signal is decoded by a decoder 37 and passed through lowpass filters (LPF) 38 and 39 with cutoff frequencies of $f_{c2}$ to obtain the two types of color difference signals R-Y and B-Y which are then converted to sequential color difference signals by a switch circuit 50 and supplied to an A/D converter 51 which is the re-sampling means.

The A/D converter 51 re-samples the input sequential color difference signals using a sampling pulse with a repetition frequency of $f_{c2}$ (here, this is 1.25 MHz). The re-sampled signals obtained are made into frame composite sampled signals by a circuit 53 having the same configuration as the first composite means outlined by the broken line 52 in FIG. 5. When a dynamic image is detected, they undergo interpolation processing performed using line correlation and are selectively output by a circuit 55 having the same configuration as the second composite means outlined by the broken line 54 in FIG. 5 and when a still image is detected, they are regarded as having been sampled at a sampling frequency of $2f_{c2}$ and are selectively output as frame composite re-sampled signals, and then output to the fifth and sixth D/A converters 56 and 57.

The D/A converters 56 and 57 both operate with repetition frequencies of $2f_{c2}$ and clock pulses with different phases so that only the analog color difference signal R-Y is taken from the fifth D/A converter 56, and so that only the analog color difference signal B-Y is taken from the sixth D/A converter 57.

These analog color difference signals R-Y and B-Y are both color difference signals with the same broadband as the color difference signals output from the lowpass filters 19 and 20 of the recording system, and are supplied to an encoder 58 where they are converted to a carrier chrominance signal with a chrominance sub-carrier frequency of 3.58 MHz which is in conformity with the NTSC system, have the unnecessary frequency component removed by a bandpass filter (BPF) 59 with a central frequency of 3.58 MHz and a passband of 2 MHz, and taken out to an output terminal 60 as reproduced carrier chrominance signal.

In this way, according to this invention, signals resampled by interpolation processing using line correlation for when there is a dynamic image detected, are used to obtain a reproduced video signal (comprising luminance signal and carrier chrominance signal), and although there is a slight aliasing component in the reproduced video signal when this is done, it is not sufficiently large enough to create a problem for normal images. Moreover, when compared to existing VTR that has a transmission bandwidth of about 3 MHz, it is possible to obtain a reproduced video signal of a broader bandwidth and to consequently achieve improved horizontal resolution. At the same time, the vertical resolution uses the low-frequency component as it is and without deterioration. Furthermore, since intra-field correlation and line correlation are used instead of frame correlation, it is possible to obtain a sufficiently high resolution even for dynamic images and images that have no frame correlation.

Still furthermore, the present invention is not limited to the embodiment described above nor is the sampling frequency restricted to 5 MHz. Also, even high-definition television signals ("Hi-Vision") can be used as the video signal and the method can be generally and widely used as a transmission system for transmitting a video signal by wireless or cable, and for devices that use magnetic disks and other media to record and reproduce the video signal.

Further, this invention is not limited to these embodiments, but various variations and modifications may be made without departing from the scope of the present invention.

What is claimed is:

1. A band compression transmission system for a video signal using sub-Nyquist sampling comprising:

sampling means for sampling a video signal which has a maximum frequency $f_m$ by first sampling pulses with a frequency $f_c$ which satisfies a formula $f_c = (N/M) \times f_H$, where M and N are positive integers satisfying a relation $N > M$, $N/M$ is an irreducible fraction, $f_H$ denotes a horizontal scanning frequency of the video signal, said frequency $f_c$ being less than or equal to twice a maximum transmission frequency of a transmission path but greater than the maximum frequency $f_m$, said first sampling pulses having a phase which differs by 180° between odd-numbered and even-numbered fields; and a digital-to-analog converter for converting a sampled signal which is obtained by sampling the video signal by said sampling means into an analog video signal and for transmitting the analog video signal on the transmission path.

2. The band compression transmission system for a video signal using sub-Nyquist sampling according to claim 1 wherein said sampling means comprises first sampling means using a first sampling pulse for luminance signal to sample a luminance signal of said video signals and second sampling means using a first sampling pulse for color difference signals to sample two types of color difference signals of said video signal, said digital-to-analog converter comprises a first digital-to-analog converter for converting sampled signals from said first sampling means into an analog luminance signal and transmitting the same to said transmission path, a second digital-to-analog converter and a third digital-to-analog converter for independently converting two types of sampled color difference signals sequentially taken from said second sampling means into analog color difference signals and transmitting the same to said transmission path, and said band compression transmission system further comprises a luminance/color separation circuit for separating said video signal into said luminance signal and a carrier chrominance signal, a decoder for decoding said carrier chrominance signal into said two types of color difference signals and supplying the same to said second sampling means, and an encoder for converting the two types of color difference signals from said second and third digital-to-analog converters into a carrier chrominance signal.

3. The band compression transmission system for a video signal using sub-Nyquist sampling according to claim 1 which further comprises re-sampling means using second sampling pulses for resampling said analog video signal taken from said digital-to-analog converter via the transmission path at said sampling frequency $f_c$ and with a phase difference of 180° between odd-numbered fields and even-numbered fields, first composition means for generating a first composite signal for a field obtained by passing signals resampled by said resampling means through frame memories and for the field two fields before that field, and digital-to-analog converters for reproduction that uses a clock frequency of $2f_c$ for converting the first composite signal generated by said first composition means into an analog reproduced video signal.

4. The band compression transmission system for a video signal using sub-Nyquist sampling according to claim 1 which further comprises re-sampling means using second sampling pulses for resampling said analog video signal taken from said digital-to-analog converter via the transmission path at said sampling frequency $f_c$ and with a phase difference of 180° between odd-numbered fields and even-numbered fields, first composition means for generating a first composite signal for a field obtained by passing signals resampled by said resampling means through frame memories and for the field two fields before that field, second composition means for generating a second composite signal by performing interpolation processing utilizing line correlation on the basis of the first composite signal generated by said first composite means and a delay signal output after predetermined delay of a horizontal scanning period of said first composite signal, a dynamic image detection circuit that uses a difference between each pixel and its surrounding pixels of said first composite signal for detecting whether said analog signal is of a dynamic or still image, and for selectively outputting said second composite signal if the image is dynamic and outputting said first composite signal if the image is still, and digital-to-analog converters for reproduction that uses a clock frequency of $2f_c$ for converting the second composite signal generated by said second composition means and the first composite signal generated by said first composition means into an analog reproduced video signal.

5. The band compression transmission system for a video signal using sub-Nyquist sampling according to claim 4 wherein said dynamic image detection circuit comprises adding means for adding resampled signals from said first composition means and delayed resampled signals from said second composite means and for outputting a difference, comparison means for comparing an output signal of said adding means with a predetermined threshold value already set, and determination means for determining from a signal output from said comparison means whether the image is a dynamic image or not.

6. The band compression transmission system for a video signal using sub-Nyquist sampling according to claim 3 wherein said first composition means comprises a switching circuit for switching for each field, first, second, third and fourth field memories for storing resampled signals from said resampling means via said switching circuit, and a switching circuit for switching and outputting for each field said first composite signal formed by composing resampled signals of the first and third fields read out from a first field memory and a third field memory of said first, second, third and fourth field memories, and formed by composing resampled signals of the second and fourth fields read out from a second field memory and a fourth field memory of said first, second, third and fourth field memories.

* * * * *